United States Patent

Ueki et al.

[15] 3,643,097

[45] Feb. 15, 1972

[54] OPTICAL FILTER FOR SUPPRESSING NOISE WHICH UTILIZES A GRADED OPTICAL FIBER AND MEANS FOR CONTROLLING TRANSVERSE POSITION OF IRIS

[72] Inventors: Atsufumi Ueki; Ryuji Tatsumi, both of Tokyo, Japan

[73] Assignee: Nippon Selfoc, Limited c/o Nippon Electric Company Limited, Tokyo, Japan

[22] Filed: Nov. 12, 1969

[21] Appl. No.: 875,853

[30] Foreign Application Priority Data

Nov. 16, 1968 Japan....................................43/83681

[52] U.S. Cl. ..........................250/201, 250/203 R, 250/227, 350/96 R, 350/96 WG

[51] Int. Cl. ......................................G01j 1/20, G02b 5/14

[58] Field of Search................350/96 WG, 175 GN, 206, 96; 250/201, 203, 227

[56] References Cited

UNITED STATES PATENTS 3,434,774 3/1969 Miller......................................350/96
3,442,574 5/1969 Marcatili..............................350/179
3,470,320 9/1969 Pike et al. ...........................350/96 X

OTHER PUBLICATIONS

Miller, S. E.: "Light Propagation in Generalized Lens-Like Media," *Bell System Technical Journal*, Vol. 44, No. 9, Nov. 1965, pages 2017 to 2022

*Primary Examiner*—James W. Lawrence
*Assistant Examiner*—T. N. Grigsby
*Attorney*—Sandoe, Hopgood and Calimafde

[57] ABSTRACT

A noise suppression optical filter having practical utility in increasing the signal-to-noise ratio of a laser communication system. The filter comprises a converging light guide element having an index of refraction which varies inversely with the square of the distance from the central axis. Irises having apertures of specified diameters are located at the input and output ends of that light guide, and means are provided to position these apertures in alignment with the light travelling through the guide.

5 Claims, 3 Drawing Figures

INVENTORS
Atsufumi Ueki
Ryuji Tatsumi
by
Sandoe, Hopgood & Calimafde
ATTORNEYS

OPTICAL FILTER FOR SUPPRESSING NOISE WHICH UTILIZES A GRADED OPTICAL FIBER AND MEANS FOR CONTROLLING TRANSVERSE POSITION OF IRIS

The present invention relates to an optical filter for removing the noise light component appearing in the light output of a laser.

It is known among those in laser field that light amplification by a laser device is always accompanied by undesirable fluorescence, which is recognized as noise in the amplified light wave. That noise is harmful to the laser output in that it deteriorates the signal-to-noise ratio of the optical communication system of which the laser is a part.

Also, it is often the case in an optical communication system that undesirable external light rays enter into the optical path of the system, thereby further deteriorating its signal-to-noise ratio.

If such noise components are included in the carrier light rays and are propagated over the transmission system, those components are unavoidably amplified along with the carrier wave component. Generally, the output power of the light wave amplifier has an inherent saturation value so that, as a result, the amplification of the carrier light wave components is suppressed by the existence of the noise components.

It is an object of the present invention to provide a laser communication system in which the optical noise component is substantially removed and a higher signal-to-noise ratio is obtained.

In copending U.S. Pat. application Ser. No. 806,360, a fibrous transparent body for optical transmission use is described, in which the refractive index decreases in substantial proportion to the square of the distance in the direction from its axis to the surface of the transparent body. More specifically, the body has a refractive index $n$ defined by $$n=n_0(1-\tfrac{1}{2}ax^2) \qquad (1)$$

where $n$ is the refractive index of the body at an arbitrary point, $n_0$ is the refractive index on the center axis of the body, $x$ is the distance from the center axis to an arbitrary point in the radial direction, and $a$ is a positive constant. A light ray incident upon the medium is propagated through such a transparent body oscillating about its axis.

According to an article by S. E. Miller published in *The Bell System Technical Journal*, Vol. 44, No. 11 (Nov. 1965) pp. 2,017–2,064, the waveform of a light ray under propagation through a medium having a refraction index distribution as defined in Eq. (1) is expressed by the equation:

$$x=A\cos\sqrt{a}Z+B\sin\sqrt{a}Z \qquad (2)$$

where $Z$ is the distance measured in the light-propagating direction along the axis of the medium, $A$ is the position of the point of incidence on the plane perpendicular to the axis, and $B$ is a constant representing the angle of incidence.

When the transparent body having the refractive index distribution as shown by Eq. (1), as proposed in said copending patent application, is used as the light transmission medium, with the light ray introduced into the transparent body, the light ray travels through the body and oscillates about the axis as indicated by Eq. (2). (The transparent body will hereinafter be referred to as a "converging light guide.")

The light ray incident on the converging light guide at its input end surface travels therethrough oscillating about the axis and taking an optical path determined by the point and angle of incidence. When a plurality of light rays are simultaneously made incident on the light guide at various angles and points of incidence, the individual light rays are propagated along the waveformlike optical paths determined by these points and angles of incidence.

The present invention is based on the foregoing properties of the converging light guide element and provides a noise suppression filter capable of removing the noise components the mode of which is different from that of the optical carrier wave component.

It is understood from Eq. (2) that two light rays made incident on he converging light guide element at the same point of incidence at the input end surface emerge from the output end surface with different points of emission, which are dependent on the angle of incidence. More definitely, assuming that the length of the converging light guide element is $l$, that the positions of the two outgoing light rays at the output end are $x_1$ and $x_2$, and that the constants dependent on the respective angles of incidence are $B_1$ and $B_2$, $x_1$ is given by:

$$x_1=A\cos\sqrt{a}\,l+B_1\sin\sqrt{a}\,l$$

and similarly, $x_2$ is given by like terms. Therefore:

$$x_1-x_2=(B_1-B_2)\sin\sqrt{a}\,l$$

It follows from the above equation that the positions $x_1$ and $x_2$ of the two outgoing light rays with different angles of incidence differ from each other at the output end, if the length $l$ of the light guide element does not meet the condition:

$$\sin\sqrt{a}\,l\neq 0$$

and consequently, $$l\neq k\pi\sqrt{a}\ (k=1, 2, 3, \ldots).$$

To prevent light rays of different points of incidence from entering into the light guide element, an iris is provided at the end of incidence. The aperture of the iris is made slightly larger than the spot size of the light rays incident to the light guide element. By this arrangement, the light guide element permits entrance of only those light rays applied to the same point of incidence. When an iris having an aperture only at the output point of the laser light ray is disposed on the output side, the light rays emerging from other positions are intercepted by the iris.

Therefore, the output light rays emergent from the iris are those light rays which enter therein through the aperture of the iris at the same angle of incidence as the laser light ray. When an iris and a light detector for detecting the laser light rays is disposed at the input and output ends of the light guide element, with the position of the iris aperture being automatically adjusted in response to the output of this detector, it becomes possible to remove practically all the transverse mode noise components except for the carrier light rays.

Assuming that $$Z=(k+\tfrac{1}{2})\frac{\pi}{\sqrt{a}} \qquad (k=0, 1, 2, \ldots)$$

in Eq. (2), the first term becomes zero, and the second term is $B$, on the condition that the absolute value of $\sin\sqrt{a}z$ is maximum. In other words, the position of the light rays at point $(Z=(k\tfrac{1}{2})\pi/\sqrt{a})$ on its cross section is determined by the angle of incidence $B$ regardless of the point of incidence.

Assume that an iris made of light-absorptive material is disposed at the output end of the converging light guide of length $l$ equal to $(k+\tfrac{1}{2})\pi/\sqrt{a}$ (where $k$=0, 1, 2, . . . ), and that the aperture of the iris is located at the position of laser light at the output end. By means of this arrangement, the noise components, except for those components which enter into the light path at the same angle of incidence as the carrier wave are absorbed by the iris, and are thus not allowed to travel through the output aperture. This serves to maximize the signal-to-noise ratio. (This is the condition in which the positional difference at the output end $(x_1-x_2)$ between the two outgoing light rays with different angle of incidence is maximized.)

According to the Miller article, the inherent spot size of the stable light rays in a similar medium having a refractive index distribution given by Eq. (1) is expressed by:

$$\bar{x}=\sqrt{\frac{\lambda_0}{\pi n_0}}\cdot\frac{1}{\sqrt[4]{a}} \qquad (5)$$

where $\lambda_0$ is the wavelength of light in the atmosphere, with its electric field distribution proportional to $$E=\exp\left[\left(\frac{x}{\bar{x}}\right)^2\right].$$

Therefore, when the diameter of the aperture ($d$) is assumed to be $d=2\bar{x}$, that portion of light rays which is not allowed to pass through the aperture, i.e., the portion of light energy adsorbed by the iris is:

$$\frac{\int_{\bar{x}}^{\infty} xE^2dx}{\int_0^{\infty} xE^2dx}=0.135.$$

This shows that 13.5 percent of the light energy is lost. When $d=4\bar{x}$, the resultant loss is negligible. If, however, the aperture is too large, the noise light component allowed to pass through this aperture becomes large.

To the accomplishment of the above and to such further objects as may hereinafter appear, the present invention relates to a noise suppression optical filter as defined in the appended claims and as described in the following specification taken together with the accompanying drawing, in which:

Figure 1:
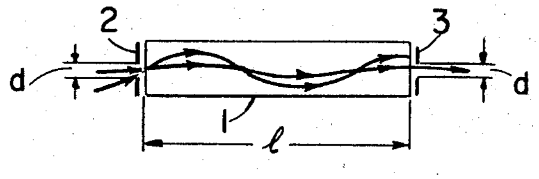
FIG. 1 is a schematic longitudinal cross-sectional view of an embodiment of the optical filter of the present invention.

In FIG. 1, a converging light guide generally designated 1 is formed from a fibrous transparent body of the type described in said copending application Ser. No. 806,368, and has an index of refraction n which decreases in substantial proportion to the square of the distance from its axis to the surface of the body. The index of refraction of light guide 1 may thus be expressed by Equation (1) above. The length $l$ of light guide 1 is given by the expression $$(k+\tfrac{1}{4})\frac{\pi}{\sqrt{a}} \leqq l \leqq (k+\tfrac{3}{4})\frac{\pi}{\sqrt{a}} \qquad (k=0, 1, 2, \ldots)$$

Irises 2 and 3, formed of light-absorptive material, are disposed respectively at the input and output ends of light guide 1, and the center axis of each iris 2 and 3 is substantially in alignment with the axis of the converging light guide 1. The central aperture of each iris has a diameter $d$ of between $2\bar{x}$ to $4\bar{x}$ where the value of $\bar{x}$ is defined in Equation (5) above. Irises 2 and 3 are disposed in close contact with the light input and output ends of light guide 1.

In the filter shown in FIG. 1, the light rays incident upon any area of the input end surface other than the aperture of the iris 2 are absorbed by the material of that iris. The light rays incident upon the light guide means from the aperture of the iris 2, namely, at the center position of the light guide means, appears on its output end at the position corresponding to the angle of incidence of the light rays. Only those light rays whose points of emission are in alignment with the aperture of iris 3 emerge as output rays through iris 3.

When the laser light rays are concentrated at the aperture of iris 2 and are introduced into the light guide at a small angle of incidence, the laser light rays emerge from the light guide in the vicinity of the center axis at the output end. Since the noise components have a wide variety of angles of incidence, a great part of the noise components is absorbed by the light-absorptive body of the iris 3 at the output end. As a result, a minimum of noise component is allowed to pass through the light guide and to appear at the output end. This greatly contributes to the achieving of a higher signal-to-noise ratio.

In the embodiment shown in FIG. 1, iris 2 disposed at the input end of light guide 1 is made of light-absorptive material. However, if desired, this iris may be made of nontransparent material since the main function of this iris is to intercept the incoming noise components. Also, instead of utilizing an iris as a filter as in the embodiment of FIG. 1, two absorptive bodies having central apertures may be disposed in the midpoint of a long light transmission path formed of the converging light guide.

Figure 2:
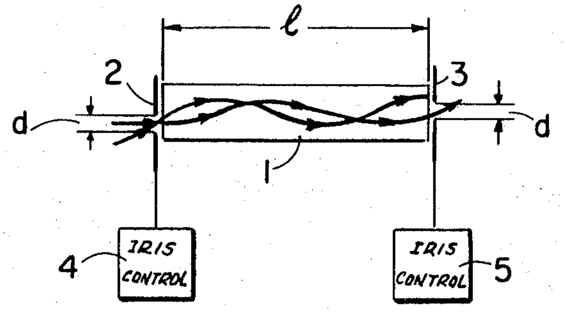
FIG. 2 is a schematic view of a second embodiment of the invention.

Another embodiment of the invention is illustrated in FIG. 2, wherein irises 2 and 3 made of light-absorptive material are respectively disposed at the input and output ends of converging light guide 1. Each iris has a central aperture of a diameter $d$ equal to between $2\bar{x}$ to $4\bar{x}$. The value of $\bar{x}$ is given by Equation (5). These irises are disposed in close contact with the light input and output surfaces of the light guide. Each of the irises 2 and 3 consists of at least three light detectors (to be described in more detail below) and iris position control devices 4 and 5 are respectively connected to irises 2 and 3.

In the embodiment of FIG. 2, the length $l$ of the converging light guide 1 is given by:

$$(k+\tfrac{1}{4})\frac{\pi}{\sqrt{a}} \leqq l \leqq (k+\tfrac{3}{4})\frac{\pi}{\sqrt{a}} \qquad (k=0, 1, 2, \ldots)$$

Therefore, the point of emergence of the light rays from the converging light guide is greatly varied by the angle of incidence. To take advantage of this property, the point of incidence of the laser light is detected by the light detector of iris 2, and its aperture is moved by the iris position control device 4. Thus, the laser light ray is made incident onto the converging light guide 1. At the output end, the point of emergence of the laser light is detected by the light detector of iris 3, with the aperture of the iris 3 moved to the detected point by the iris position control device 5. Control devices 4 and 5 may be of the type described in the copending U.S. Pat. application Ser. No. 839,236 filed July 7, 1969. As described in said copending application, the control devices each include a pair of pulse-driven motors that receive X and Y control signals from a control signal generator (not shown), which in turn, includes a pair of differential amplifiers. Control devices 4 and 5 in response to the input X and Y control signals are effective to respectively correct the Y and Y coordinate positions of irises 2 and 3. As a result, the laser light rays, after having passed through the light guide, are allowed to emerge from the aperture of the iris 3. Only the noise components incident at the input end at nearly the same angle of incidence as the carrier components are allowed to pass through the iris 3 along with the carrier component. All other noise components are absorbed by irises 2 and 3. In this way the signal-to-noise ratio of the communication system is improved.

Figure 3:
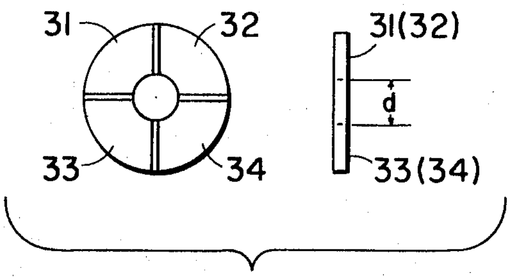
FIG. 3 illustrates a noise suppression means for use with the embodiments of FIGS. 1 or 2.

FIG. 3 is a schematic diagram showing an example of composition of irises 2 and 3 which may be employed in the embodiments of FIGS. 1 and 2. The iris is split into four sectors 31, 32, 33 and 34, each of which is formed of a light detector material. When the iris is irradiated, the sectors 31, 32, 33 and 34 produce different outputs according to the intensity of the light respectively applied thereto. The outputs of these sectors are sensed by the iris control devices 4 and 5 which, in response, control the position of their associated irises. This provides a two-dimensional recognition of the light beam intensity distribution and the transverse position of the iris is thus automatically controlled by the iris position control device to align the central axis of the iris apertures with the light beam travelling through the light guide 1.

When the iris control device is operated normally, little of the carrier light rays components is incident upon the light detector, but the noise component is always incident thereupon. However, since the noise intensity distribution is constant, there will be no difference between the outputs of the light detectors. There is substantially no fear of causing error in the positional control of the iris, except when the noise light is extremely intense.

According to this embodiment, it is not necessary to make adjustments for accurately making the laser light rays incident on the axis of the converging light guide. Therefore, the operation of the laser device can be greatly simplified.

While only two embodiments of the present invention have been herein specifically described, it will be understood that modifications may be made therein without departing from the spirit and scope of the invention.

We claim:

1. A noise suppression optical filter for operation on a light beam having a wavelength $\lambda_o$ in vacuum comprising a converging light guide having a refractive index given by the expression $n=n_o(1-\frac{1}{2}ar^2)$, where $n_o$ is the refractive index on the axis of said light guide, $a$ is a positive converging coefficient specific to said light guide, and $r$ is a radial distance from the axis, and a length $l$ given by the expression $$(k+\tfrac{1}{4})\pi/\sqrt{a} \leqq l \leqq (k+\tfrac{3}{4})\pi/\sqrt{a} \qquad (k=0,1,2,\ldots),$$

a first iris disposed at the input end of said light guide and having a circular aperture at its center part, the diameter of said aperture being two to four times as great as the value $$\sqrt{\lambda_o/\pi n_o}/\sqrt[4]{a},$$

and a second iris formed of light-absorptive material and disposed at the output end of said light guide means and having a circular aperture at its center, the diameter of the aperture of said second iris being two to four times as great as the value $$\sqrt{\lambda_o/\pi n_o}/\sqrt[4]{a}.$$

2. The noise suppression optical filter of claim 1 further comprising light-detecting means composed of a plurality of separate partial detectors disposed on the surface of one of said irises on the side facing the incoming light sources, and means connected to said detectors for transversely moving said one of said irises in response to the output of said light-detecting means to align the center of the aperture of said iris with the light beam travelling through said light guide means.

3. The noise suppression optical filter of claim 2, in which the other of said irises comprises second separate partial detectors, and further comprising second moving means connected to the other of said irises for transversely moving the latter in response to the output of said second detectors.

4. A noise suppression optical filter comprising a converging light guide element having input and output ends and a length $l$ given by the expression $$\tfrac{1}{4}\pi/\sqrt{a} \leqq l \leqq \tfrac{3}{4}\pi\sqrt{a}$$

where $a$ is the converging coefficient specific to said light guide element, a first iris disposed at said input, a second iris disposed at said output end, each of said irises having a central aperture, at least one of said irises comprising a plurality of separate light detectors on the light incident surface thereof, and means connected to said iris and responsive to the relative outputs of said light detectors to align the aperture of said one of said irises with the light beam travelling through said light guide element.

5. The noise suppression optical filter of claim 4, in which the other of said irises comprises second separate detectors, and further comprising second moving means connected to the other of said irises for transversely moving the latter in response to the output of said second detectors.

* * * * *